United States Patent
Araki et al.

(10) Patent No.: US 8,464,472 B2
(45) Date of Patent: Jun. 18, 2013

(54) WEATHER STRIP

(75) Inventors: Kenichi Araki, Hiroshima (JP); Hiroyuki Yoshii, Hiroshima (JP)

(73) Assignee: NIFCO Inc., Yokohama-Shi (JP)

( * ) Notice: Subject to any disclaimer, the term of this patent is extended or adjusted under 35 U.S.C. 154(b) by 846 days.

(21) Appl. No.: 12/216,140

(22) Filed: Jun. 30, 2008

(65) Prior Publication Data

US 2009/0007498 A1 Jan. 8, 2009

(30) Foreign Application Priority Data

Jul. 2, 2007 (JP) ................................ 2007-173883

(51) Int. Cl.
*E06B 7/16* (2006.01)

(52) U.S. Cl.
USPC ........................ 49/492.1; 49/479.1

(58) Field of Classification Search
USPC ............ 49/483.1, 479.1, 492.1, 493.1, 475.1; 24/289, 292, 297, 295, 581.11; 411/104
See application file for complete search history.

(56) References Cited

U.S. PATENT DOCUMENTS

| | | | | |
|---|---|---|---|---|
| 3,071,826 | A | * | 1/1963 | Ziffer ............................ 49/492.1 |
| 3,182,770 | A | * | 5/1965 | Shemet ....................... 403/408.1 |
| 4,987,656 | A | * | 1/1991 | Sato ................................ 24/297 |
| 5,704,753 | A | * | 1/1998 | Ueno ............................. 411/509 |
| 2004/0016088 | A1 | * | 1/2004 | Angellotti ....................... 24/297 |
| 2004/0216384 | A1 | * | 11/2004 | Teramoto et al. ............. 49/479.1 |

FOREIGN PATENT DOCUMENTS

| | | |
|---|---|---|
| CN | 2122771 U | 11/1992 |
| CN | 1496809 A | 5/2004 |
| CN | 1608902 A | 4/2005 |
| JP | S60-030814 | 2/1985 |
| JP | S61-174392 | 8/1986 |
| JP | H06-068941 | 9/1994 |
| JP | 2001-080431 | 3/2001 |
| JP | 2001-206158 | 7/2001 |
| JP | 2002-192955 | 7/2002 |
| JP | 2004-505195 | 8/2004 |

OTHER PUBLICATIONS

The American Heritage® Dictionary of the English Language, Fourth Edition copyright © 2000 by Houghton Mifflin Company. Updated in 2009. Published by Houghton Mifflin Company. All rights reserved. http://www.thefreedictionary.com/laminating.*
Collins English Dictionary—Complete and Unabridged © HarperCollins Publishers 1991, 1994, 1998, 2000, 2003 http://www.thefreedictionary.com/pitch.*

* cited by examiner

*Primary Examiner* — Katherine Mitchell
*Assistant Examiner* — Justin Rephann
(74) *Attorney, Agent, or Firm* — Manabu Kanesaka

(57) ABSTRACT

A weather strip includes a flexible strip main body, and a core embedded in the strip main body. The core includes a core main body having an engaged portion and an engaging leg member to be inserted into and engaged with a mounting hole on a mounting object. The engaging leg member has a first engaging portion for engaging the mounting hole and a second engaging portion for engaging the engaged portion of the core. At least the first engaging portion is not covered by the strip main body.

10 Claims, 9 Drawing Sheets

WEATHER STRIP

BACKGROUND OF THE INVENTION AND RELATED ART STATEMENT

The present invention relates to an improvement of a weather strip for sealing between an opening border of various types of openings formed in the body of an automobile, and a door which closes the openings so as to be able to open in the closed state.

There is a weather strip wherein an insert panel (core material) is buried (Refer to Patent Document 1: Journal of Technical Disclosure No. 2004-505195 published by the Japan Institute of Invention and Innovation). This kind of weather strip integrally includes an axis-like clip in the insert panel, and by inserting and engaging the clip with a mounting hole of a door inner panel, the weather strip can be assembled to a door frame. However, in the case wherein the body of the automobile has complicated three-dimensional curved surfaces, the door frame also has complicated three-dimensional curved surfaces. Accordingly, the above-mentioned insert panel is required to have the same kind of shape. However, when the insert panel is molded in this kind of shape while molding an engaging portion in the clip, an undercut shape tends to be produced, so that a special consideration was required for a die design, and also the die was complicated. Also, due to the above-mentioned reasons, the molding die of the insert panel had limited possibilities for the die design, so that it was difficult to provide an innovative shape for the insert panel in order to enhance the rigidity.

A main object of the present invention is to provide a weather strip molded with a core material including engaging leg members inserted and engaged with a mounting hole formed in a mounting object as an insert, wherein the core material is molded according to the three-dimensional curved surfaces of the mounting object.

Further objects and advantages of the invention will be apparent from the following description of the invention.

SUMMARY OF THE INVENTION

In order to achieve the object of the present invention, in this invention, a weather strip includes the following structures (1)-(3).

(1) A weather strip includes a synthetic resin core material provided as an insert.

(2) The core material is provided with an engaging leg member which is inserted and engaged with a mounting hole in a mounting object with a tip-end side engaging portion. At least the tip-end side engaging portion of the engaging leg member is made not to be covered by a strip main body made from plastic with a rubber elasticity; and (3) The engaging leg member is provided in the core material by engaging a base-side engaging portion formed in the engaging leg member with an engaged portion formed in a core material main body.

Since the tip-end side engaging portion of the engaging leg member of the core material is not covered by the strip main body, the weather strip can be assembled by inserting and engaging the tip-end side engaging portion of the engaging leg member which corresponds to the mounting hole of the mounting object. In the case wherein the body of an automobile has complicated three-dimensional curved surfaces, the core material is also required to have the same shape. However, since the core material is made by combining the core material main body and the engaging leg member which are molded and prepared as separate members, compared with the case wherein both the core material main body and the engaging leg member are integrally molded, it is less prone to produce an undercut shape and the like, so that the core material and the weather strip can be easily molded according to corresponding the three-dimensional curved surfaces without complicating the die structure. Also, the configuration of the core material can be reconstructed by changing materials between the core material main body and the engaging leg member if necessary The engaged portion of the core material main body may be formed at a groove terminal end portion of a penetration groove (e.g., elongated hole), said penetration groove extending from an introduction-through hole.

In this case, by introducing the base-side engaging portion of the engaging leg member to the penetration groove by using the introduction-through hole and completely moving the base-side engaging portion to the terminal end portion by being guided by the penetration groove, the base-side engaging portion can be engaged with the engaged portion and, then, the engaging leg member can be assembled to the core material main body.

The base-side engaging portion of the engaging leg member includes a head portion and a neck portion. The engaged portion of the core material main body is formed at the terminal end portion of the penetration groove in such a way as to form a grappling face of the head portion of the engaging leg member at a side of one face of the core material main body. Also, the engaged portion of the core material main body includes a deepest portion which houses the neck portion; and a narrow portion which allows the neck portion to be introduced to the deepest portion by an elastic deformation. Additionally, the head portion of the base-side engaging portion includes a pair of linear marginal portions, and a distance between the pair of liner marginal portions may be roughly equal to a width of the penetration groove.

In this case, the base-side engaging portion of the engaging leg member which is inserted into the introduction-through hole can be inserted into the penetration groove only in a direction wherein the linear marginal portions of the head portion are slid and contacted to the groove wall of the penetration groove. Next, the narrow portion is elastically pushed and widened by the neck portion in a process that the base-side engaging portion which was inserted into the penetration groove as mentioned above is completely moved to the terminal end portion of the penetration groove, and herewith, the elasticity is returned when the neck portion is allowed to proceed into the deepest portion, so that the base-side engaging portion of the engaging leg member can be reliably assembled to the engaged portion of the core material main body in a mounting direction by a one touch.

According to the invention, the core material comprises the engaging leg member and the core material main body, and the engaging leg member includes the tip-end side engaging portion and the base-side engaging portion to be inserted and engaged with the mounting hole of the mounting object. The core material is configured by engaging the base-side engaging portion with the engaged portion of the core material main body. As a result, the core material main body can be molded freely according to the three-dimensional curved surfaces of the mounting object. Also, the strip main body is molded not to cover the tip-end side engaging portion, and the weather strip can be easily assembled to the mounting object.

DETAILED DESCRIPTION OF PREFERRED EMBODIMENTS

Hereinafter, preferred embodiments of the present invention are explained with reference to FIGS. 1 to 11.

Figure 1:
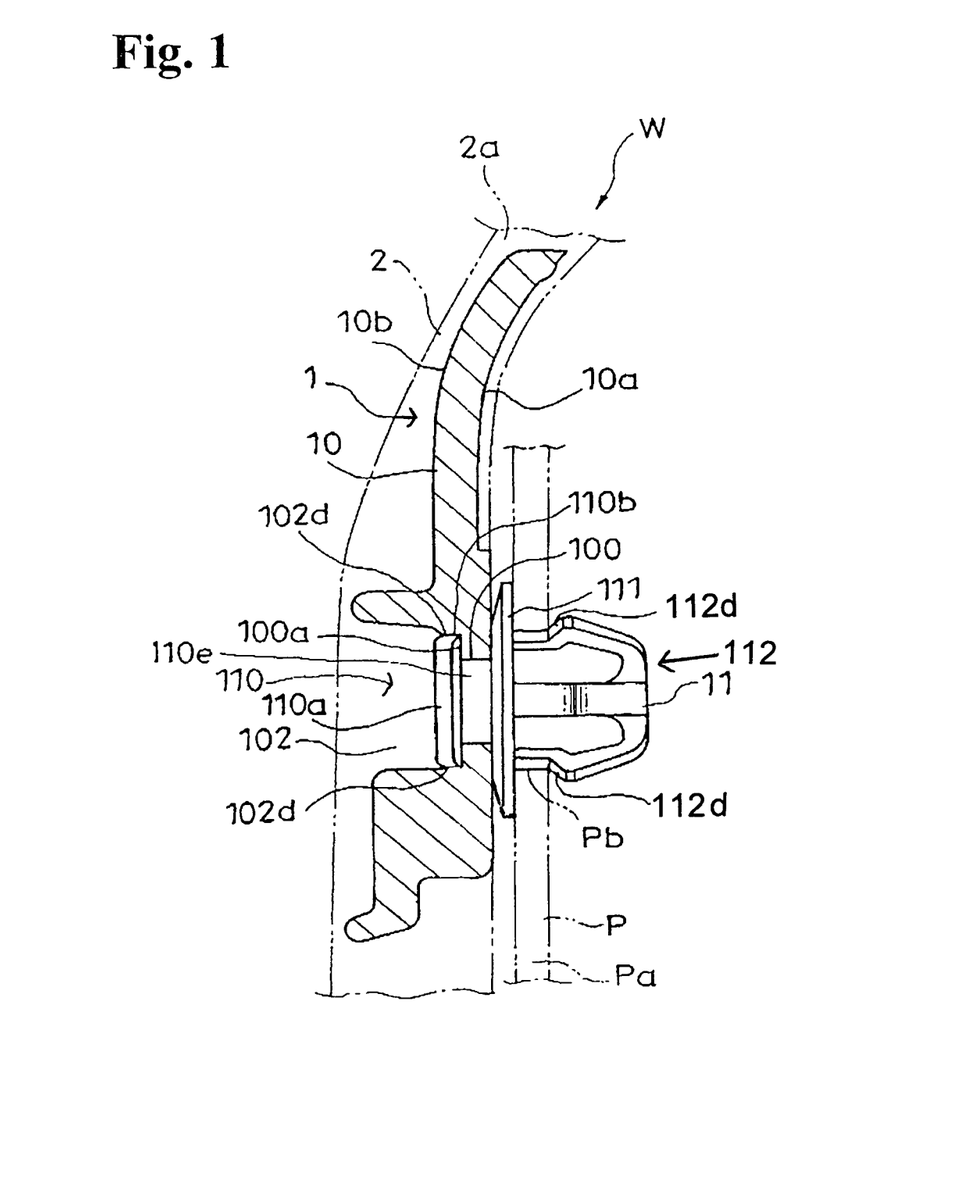
FIG. 1 is a sectional view taken along line 1-1 in FIG. 7, showing a weather strip W in use.
Figure 2:
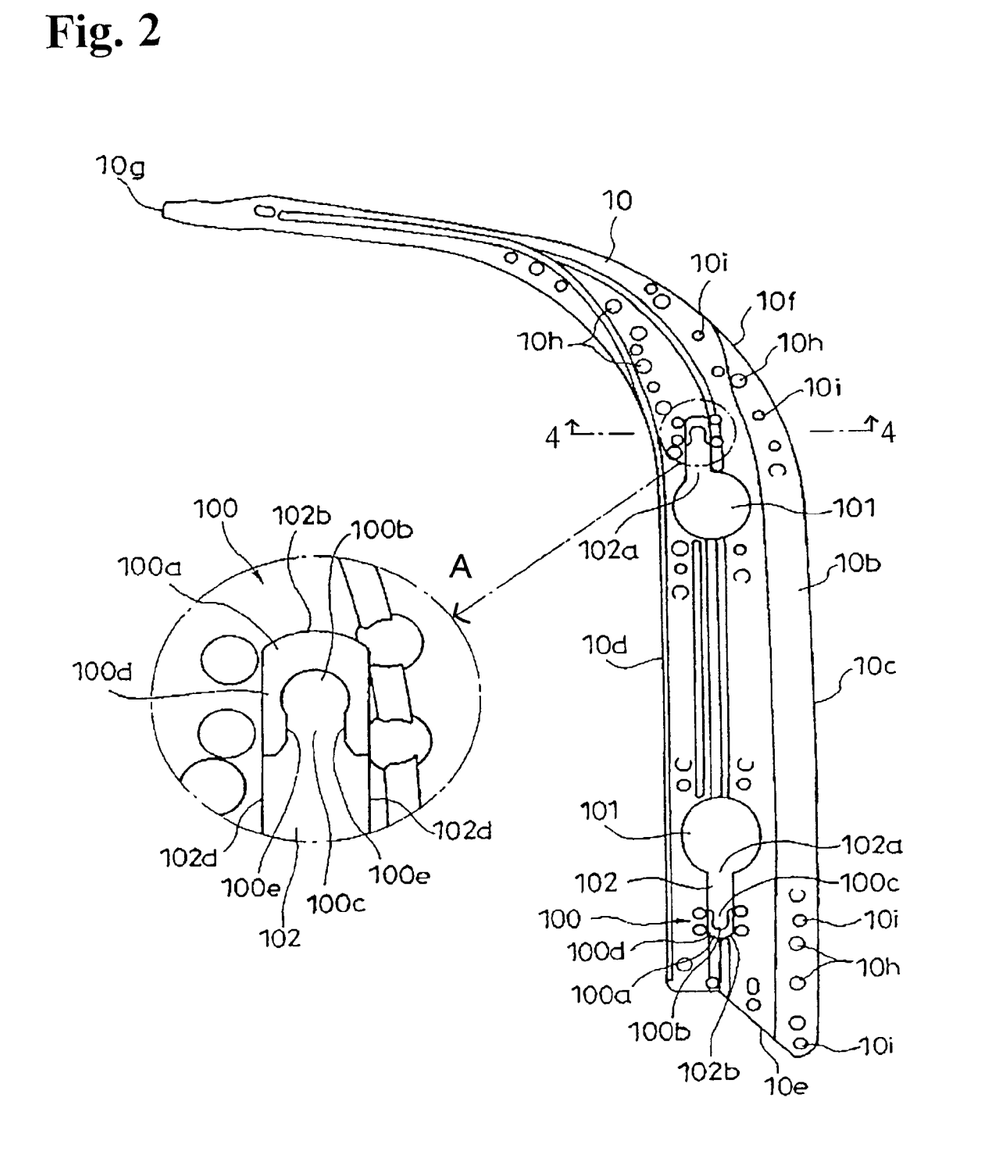
FIG. 2 is a front structural view showing a surface of a core material main body.
Figure 3:
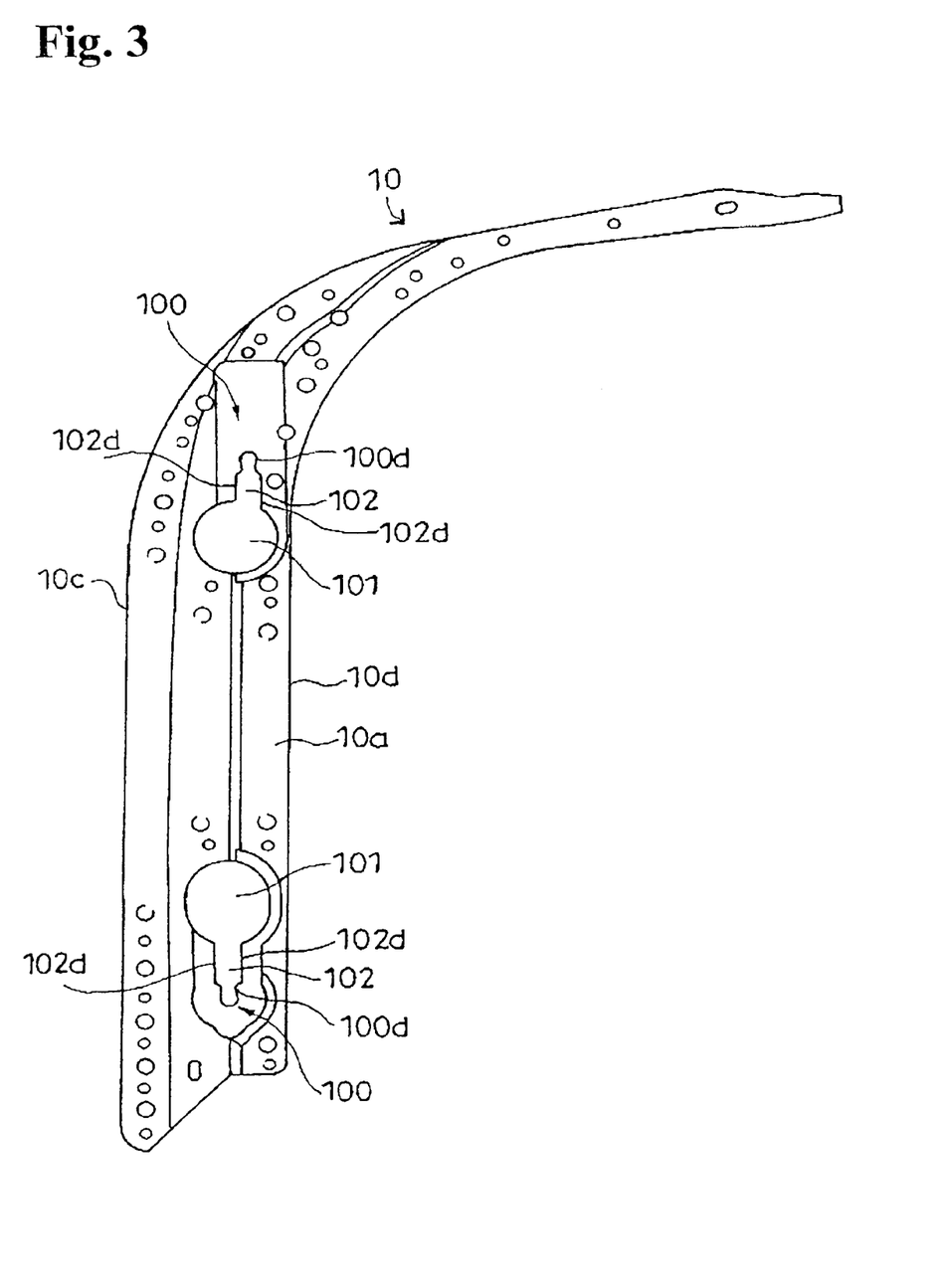
FIG. 3 is a rear surface structural view thereof.
Figure 4:
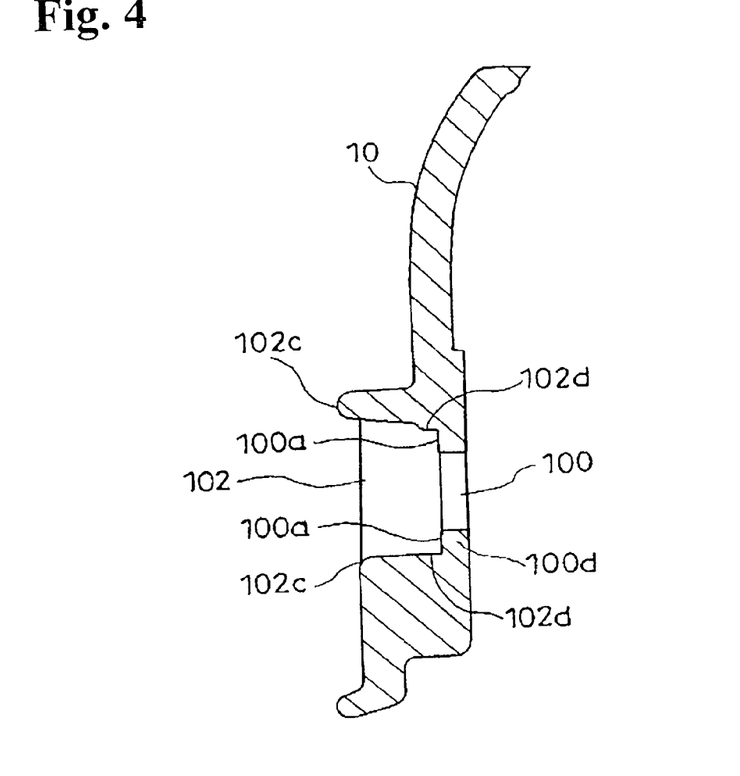
FIG. 4 is an end face structural view taken along line 4-4 in FIG. 2.
Figure 5:
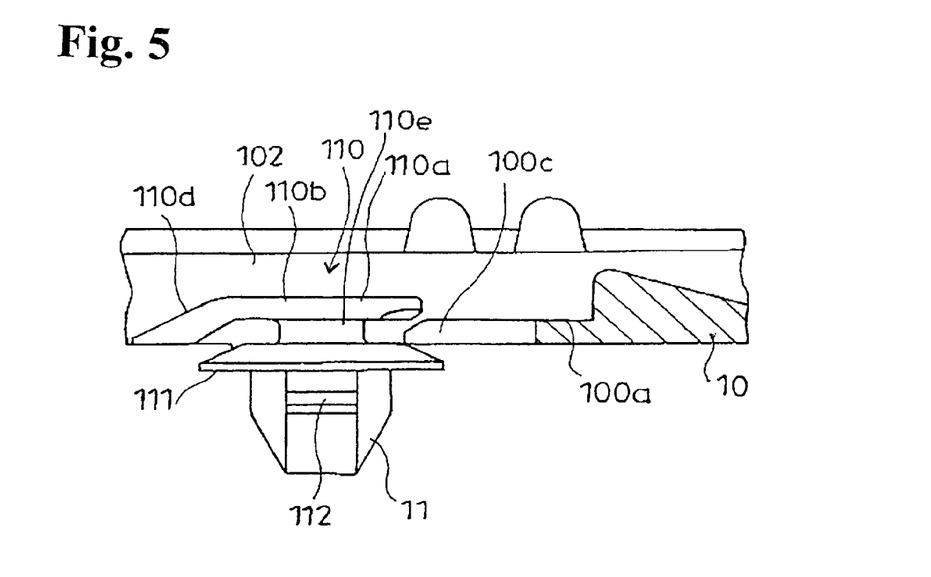
FIG. 5 is a sectional view, similar to FIG. 6, showing a process wherein an engaging leg member is assembled to the core material main body.
Figure 6:
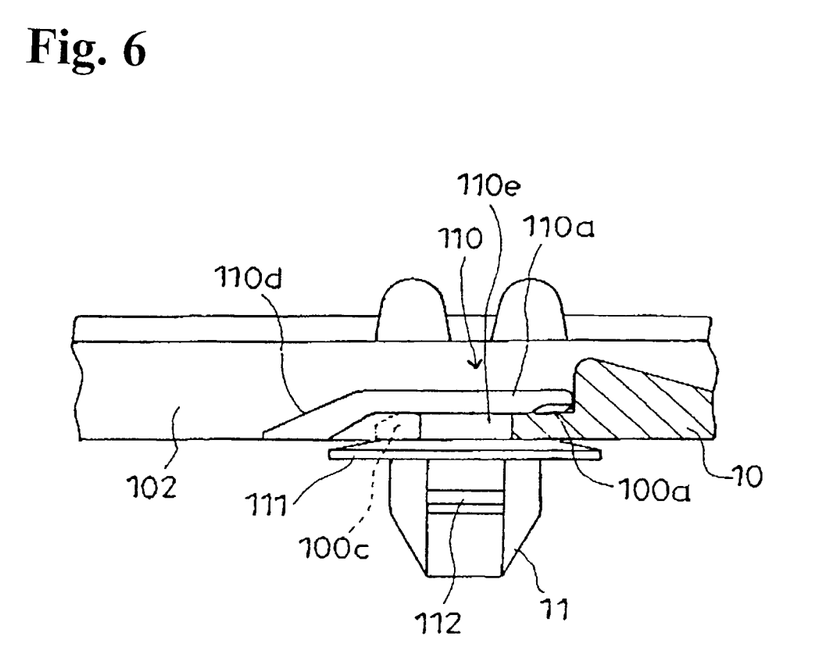
FIG. 6 is a sectional view taken along line 6-6 in FIG. 7, in a state wherein the engaging leg member is assembled to the core material main body.
Figure 7:
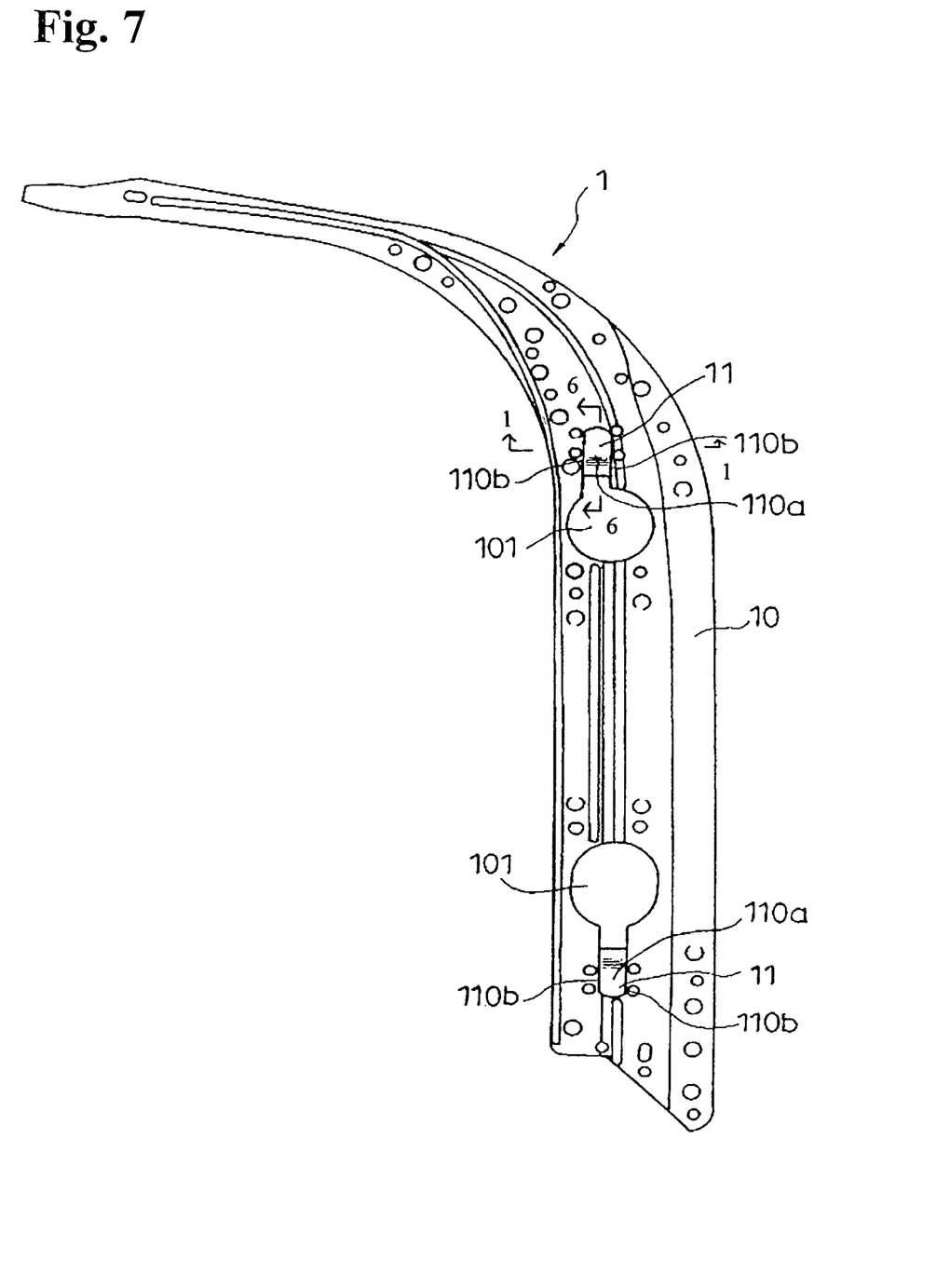
FIG. 7 is a front surface structural view of a core material.
Figure 8:
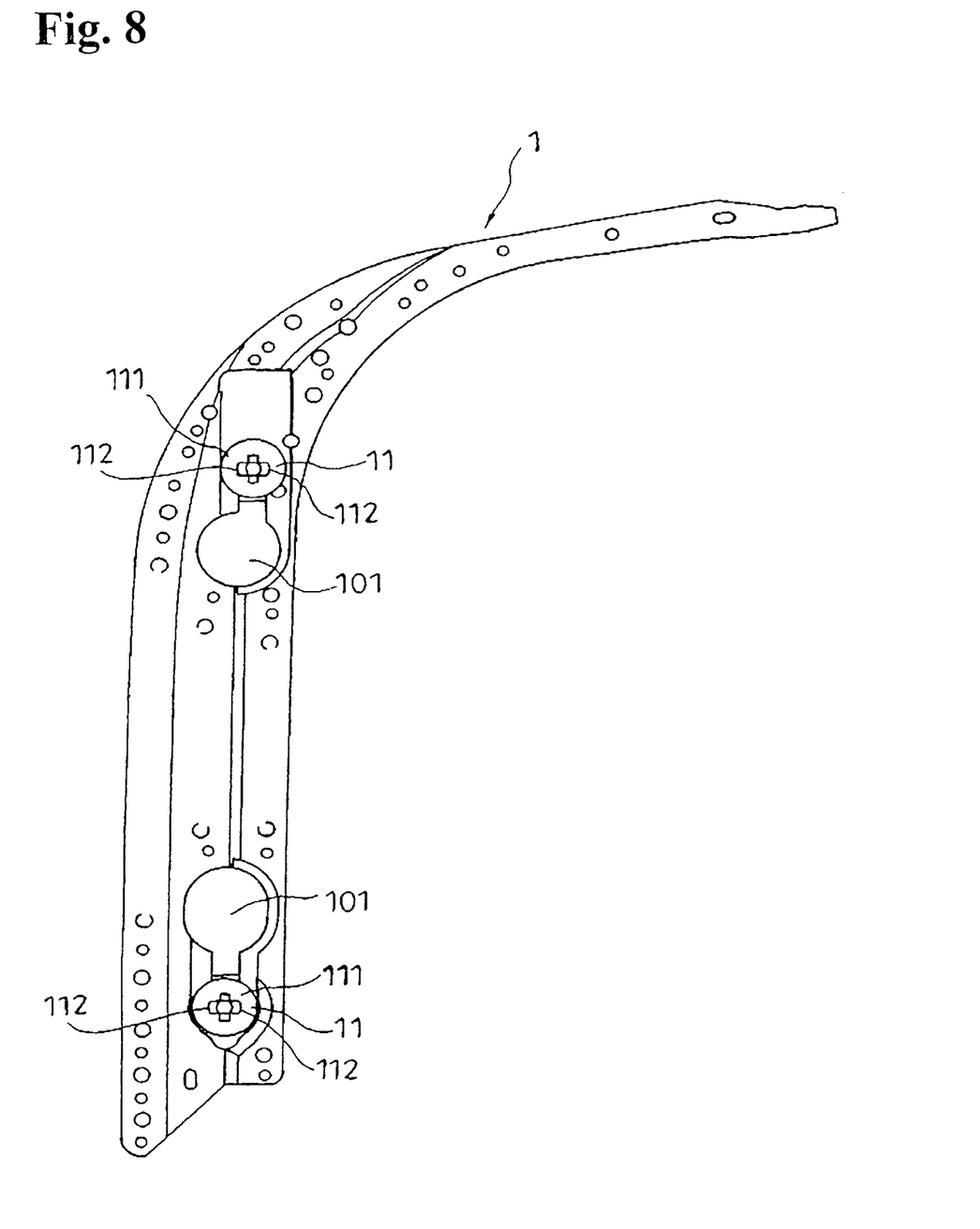
FIG. 8 is a back surface structural view of the core material.
Figure 9:
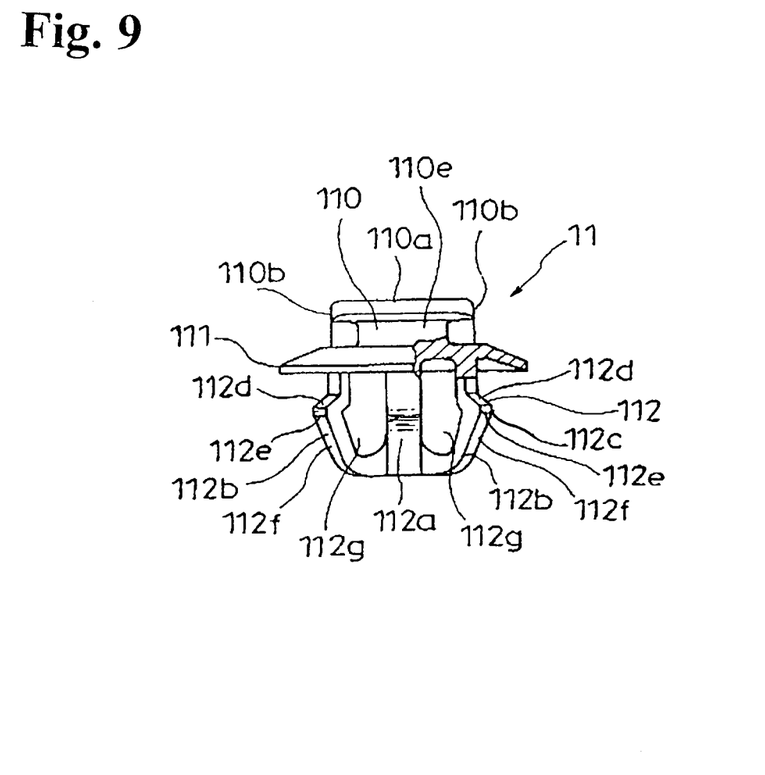
FIG. 9 is a partially broken front view of the engaging leg members.
Figure 10:
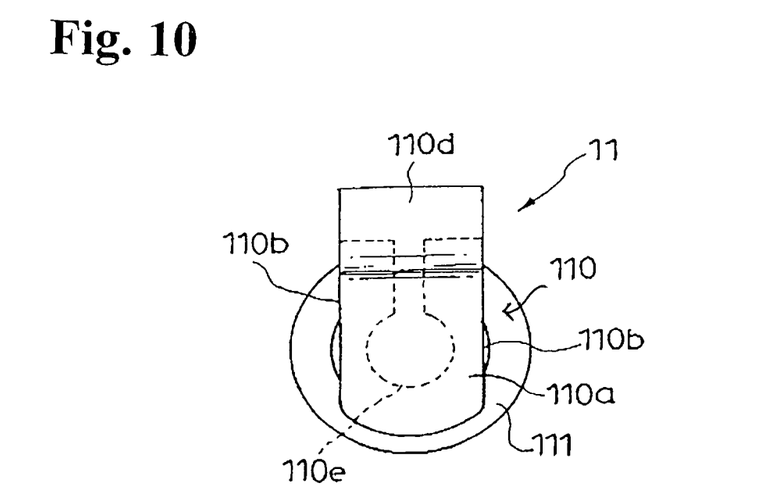
FIG. 10 is a plan view thereof.
Figure 11:
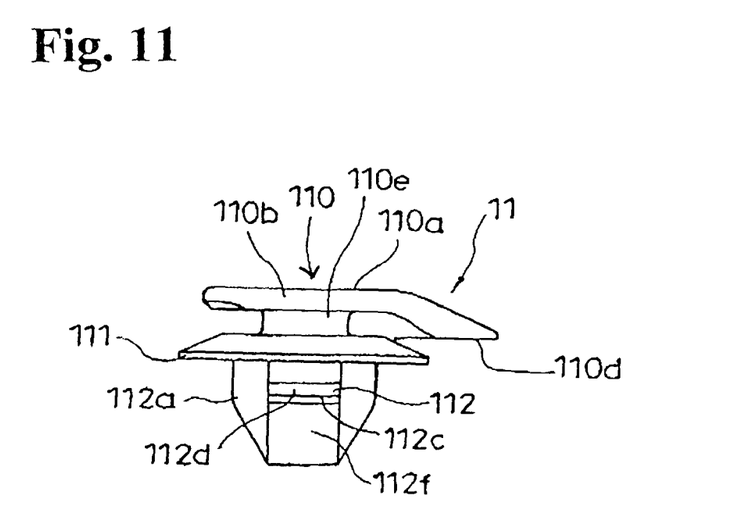
FIG. 11 is a left side view thereof.

Incidentally, FIG. 1 shows a state of a weather strip W assembled to a mounting object P by showing a strip main body 2 as an imaginary line and a core material main body 10 as a section. Also, FIGS. 2-4 respectively show the core material main body 10, and FIG. 3 shows the core material main body 10 viewed from the other face side opposite to FIG. 2. FIGS. 5, 6 show the core material main body 10 as a section at a portion wherein engaged portion 100 is formed so that the process wherein engaging leg member 11 is assembled to the engaged portion 100 of the core material main body 10 can be easily understood. FIG. 5 shows a state wherein base-side engaging portion 110 of the engaging leg members 11 is started to be inserted into penetration groove 102 configuring the engaged portion 100. FIG. 6 shows a state wherein the base-side engaging portion 110 of the engaging leg member 11 is completely inserted into the penetration groove 102. Also, FIGS. 7, 8 show a core material 1 respectively, and FIGS. 9 to 11 show the engaging leg member 11, respectively. Incidentally, in FIGS. 2, 3, 7, 8, penetration holes 10h and small projections 10i which are formed in the core material main body 10 are not entirely shown, and only those are partly shown and the rest is omitted.

The weather strip W according to the embodiment is typically used for sealing between an opening border of various types of openings formed in the body of an automobile, and a door or a lid which blocks the opening so as to be able to open in the blocked state.

More specifically, when the weather strip W is used for sealing, for example, between the door opening of the body and the door, a lip 2a is assembled in such a way as to protrude outside from the border portion of a door frame relative to a panel Pa at a vehicle interior side comprising the door frame. When the door is closed, the lip 2a is pressed against the opening border of the door opening in a state wherein the lip 2a is elastically deformed, and the weather strip W is used for the above-mentioned sealing.

The weather strip W comprises a synthetic resin core material 1 as an insert. More specifically, the weather strip W is configured by integrally uniting the core material 1 and the strip main body 2 by covering a necessary area on the outside of the core material 1 with the strip main body 2 comprising plastic with rubber or elastic material by insert molding. In this insert molding, the strip main body 2 is molded in such a way as to include a desired outer shape, and the lip 2a is configured by the strip main body 2. The core material 1 is harder than the strip main body 2, and by injection molding following the insert molding, the desired outer shape can be molded and prepared.

In an example shown in the figures, the core material 1 is molded in such a way that a part is curved in order to have a shape according to the corner of the door frame. In the example shown in the figures, the core material 1 is configured by the core material main body 10 having a plate shape with length and width as a main material. One side face 10a of the core material main body 10 becomes a face on the mounting side relative to the panel Pa. Both faces 10a, 10b of the core material main body 10 include an outer border 10c located outside a curve and an inner border 10d located inside the curve. A distance between both borders 10c and 10d is comparatively and roughly even and large between one end 10e side of the core material main body 10 and a curved portion 10f. Subsequently, as the core material main body 10 extends toward the other end 10g side from the curved portion 10f, the core material main body 10 decreases gradually, and in the other end 10g of the core material main body 10, both borders 10c and 10d come close and the other end has a thin stick shape.

Also, in the example shown in the figures, in the core material main body 10, a plurality of penetration holes 10h (shown in a circle with a large diameter in FIGS. 2, 3, 7, 8) is formed, and a plurality of small projections 10i (shown in a circle with a small diameter in FIGS. 2, 3, 7, 8) is projected from both faces, respectively. Accordingly, unity between the core material main body 10 and the strip main body 2 can be improved.

Also, in the core material 1, the engaging leg member 11 is provided, to be inserted into a mounting hole Pb formed in the panel Pa which becomes a mounting object P, and engaged with the mounting hole Pb by tip-end side engaging portion 112 (first engaging portion). Also, the engaging leg member 11 is provided in the core material 1 by engaging the base-side engaging portion 110 (second engaging portion) formed in the engaging leg member 11 with the engaged portion 100 formed in the core material main body 10. At least the tip-end side engaging portion 112 of the engaging leg member 11 is not covered by the strip main body 2.

More specifically, in the embodiment, the core material 1 is configured by combining the core material main body 10 and the engaging leg members 11, and also the strip main body 2 is molded with the core material 1 as the insert in such a way as not to cover the tip-end side engaging portion 112 of the engaging leg member 11. (FIG. 1)

Since the tip-end side engaging portion 112 of the engaging leg member 11 of the core material 1 is not covered by the strip main body 2, the weather strip W can be assembled by inserting and engaging the tip-end side engaging portion 112 of the engaging leg member 11 with the mounting hole Pb of the panel Pa. In the case that the body of the automobile has complicated three-dimensional curved surfaces, the panel Pa also has the above-mentioned three-dimensional curved surfaces, so that the core material 1 is also required to have the shape according to the three-dimensional curved surfaces. However, since the core material main body 10 and the engaging leg member 11 are molded and prepared as separate members, combined together, and make the core material 1, compared to the case that both core material main body 10 and the engaging leg member 11 are integrally molded, it is difficult to produce an undercut shape and the like, so that the core material 1 and the weather strip W can be easily molded according to the three-dimensional curved surfaces without complicating die structure. Also, the core material 1 can be configured by changing materials of the core material main body 10 and the engaging leg member 11 according to needs. For example, if the core material main body 10 is made from fiber-reinforced plastic, rigidity of the overall core material 1 can be improved without decreasing the elasticity of the engaging leg members 11.

In the example shown in the figures, the engaged portion 100 of the core material main body 10 is formed to have terminal end portion 102b of the penetration groove 102 wherein groove-beginning end 102a is communicated with introduction-through hole 101.

In the example shown in the figures, the engaged portions 100 and the introduction-through holes 101 are provided at two portions and spaced in a length direction of the core material main body 10 between one end 10e and the curved portion 10f of the core material main body 10. The introduction-through hole 101 has a circular shape. The penetration groove 102 allows the groove-beginning end 102a to communicate with the introduction-through hole 101 and extends along the length direction of the core material main body 10. In the example shown in the figures, the penetration groove 102 wherein one of the two engaged portions 100 is formed is located on the side of one end 10e of the core material main body 10. This penetration groove 102 communicates with the introduction-through hole 101 which is located on the side of the end 10e rather than the penetration groove 102, and extends to the side of one end 10e of the core material main body 10. Also, the penetration groove 102 wherein the other of two engaged portions 100 is formed is located on the side of the curved portion 10f of the core material main body 10. The penetration groove 102 communicates with the introduction-through hole 101 which is located on the side of one end 10e of the core material main body 10 rather than the penetration groove 102, and extends to the side of the curved portion 10f of the core material main body 10.

Herewith, in the example shown in the figures, by using the above-mentioned introduction-through hole 101, the base-side engaging portion 110 of the engaging leg member 11 is introduced to the penetration groove 102, and the base-side engaging portion 110 is completely moved to the terminal end portion 102b by being guided by the penetration groove 102. As a result, the base-side engaging portion 110 can be engaged with the engaged portion 100, and the engaging leg member 11 can be assembled to the core material main body 10.

In the example shown in the figures, the base-side engaging portion 110 (second engaging portion) of the engaging leg member 11 includes head portion 110a and neck portion 110e.

Also, the engaged portion 100 of the core material main body 10 is formed in the terminal end portion 102b of the penetration grooves 102 in such a way as to form grappling face 100a of the head portion 110a of the engaging leg member 11 at the side of one face (side of the other face 10b opposite to the mounting side on the panel Pa in the example shown in the figures) of the core material main body 10. Also, the engaged portion 100 of the core material main body 10 includes deepest portion 100b housing the neck portion 110e; and narrow portion 100c allowing the neck portion 110e to be introduced to the deepest portion 100b by elastic deformation.

Also, the head portion 110a of the base-side engaging portion 110 of the engaging leg member 11 includes a pair of linear marginal portions 110b, and the distance between this pair of liner marginal portions 110b is roughly equal to the width of the penetration groove 102.

Herewith, in the example shown in the figures, the base-side engaging portion 110 of the engaging leg member 11 which was inserted into the introduction-through hole 101 can be inserted into the penetration groove 102 only by the direction wherein the linear marginal portion 110b of the head portion 110a slides and contacts groove wall 102d of the penetration groove 102. Next, the narrow portion 100c is elastically pushed and opened by the neck portion 110e in the process wherein the base-side engaging portion 110 which was inserted into the penetration groove 102 as mentioned above is completely moved to the terminal end portion 102b of the penetration groove 102. Herewith, the elasticity is returned when the neck portion 110e is allowed to proceed into the deepest portion 100b. As a result, the base-side engaging portion 110 of the engaging leg member 11 can be reliably assembled to the engaged portion 100 of the core material main body 10 in a mounting direction by one touch.

In the example shown in the figures, the engaged portion 100 is made open at the side of the introduction-through hole 101 and includes roughly U-shaped flange portion 100d which border inside of the terminal end portion 102b in such a way as to form the grappling face 100a with a step surface in the terminal end portion 102b of the penetration groove 102 between groove borders 102c located on the side of the other face 10b of the core material main body 10. The grappling face 100a of the flange portion 100d and the face of the opposite side are configured in such a way as to form the same face with one face 10a of the core material main body 10. In the opening portion of the roughly U-shaped flange portion 100d, projections 100e respectively projecting to the inside are formed, and due to the projections 100e, the opening portion is slightly narrower than diameters of the neck portion 110e of the base-side engaging portion 110 of the engaging leg member 11. When the neck portion 110e is introduced into the deepest portion 100b, lower surface (jaw face) of the head portion 110a is widely contacted to the grappling face 100a of the flange portion 100d at the portion except for the opening portion.

The engaging leg member 11 integrally includes the base-side engaging portion 110 comprising the head portion 110a and the neck portion 110e on one side. Also, the engaging leg member 11 includes the tip-end side engaging portion 112 on the other side sandwiching the intermediate flange 111.

The neck portion 110e configuring the base-side engaging portion 110 is located between the intermediate flange 111 and the head portion 110a, and has an axis shape whose external diameter is smaller than both the intermediate flange 111 and the head portion 110a. Also, the head portion 110a is configured as a plate with some length and width. The linear marginal portions 110b are formed at the head portion 110a. Also, one end side of the head portion 110a projects outwardly more than the intermediate flange 111. Protruding portion 110d declines gradually toward the intermediate flange 111 as the protruding portion 110d extends to a terminal portion, so that the neck portion 110e cannot be inserted into the penetration groove 102 from a protruding portion 110d side. Herewith, in the example shown in the figures, the neck portion 110e of the base-side engaging portion 110 of the engaging leg member 11, which is inserted into the introduction-through hole 101 in such a way as that the tip-end side engaging portion 112 protrudes from one side face 10a of the core material main body 10, can be pushed into the penetration groove 102 from the opposite side of the protruding portion 110d in such a way as to press against the declined external surface of the protruding portion 110d by a finger.

The tip-end side engaging portion 112 includes core portion 112a integrally protruding from the intermediate flange 111 at the other side of the intermediate flange 111 with both long surfaces in the length direction of the head portion 110a; and elastic piece portions 112b integrally connecting one end to the end of the core portion 112a at both ends of the core portion 112a and integrally connecting the other end to the intermediate flange 111. Transformation gap 112g is formed between the core portion 112a and the elastic piece portion 112b. Also, the intermediate flange 111 has a size so as not to be inserted into the mounting hole Pb of the panel Pa, and engaging projections 112c with engaging faces 112d which face the side of the intermediate flanges 111 are formed on outer faces of the pair of elastic piece portions 112b. The size between top portions 112e of the engaging projections 112c of the pair of elastic piece portions 112b is made slightly larger than the diameter of the mounting hole Pb of the panel Pa. Inclining hem face 112f is formed between the top portion 112e of the engaging projection 112c and one end of the elastic piece portion 112b, and make it easy to be inserted into the mounting hole Pb. Herewith, in the example shown in the figures, after the elastic piece portions 112b are once bent in the process wherein the tip-end side engaging portion 112 is inserted into the mounting hole Pb of the panel Pa, a recovery force is produced at the position wherein the top portions 112e of the engaging projections 112c are slipped out to the front from the inserting end of the mounting hole Pb. As a result, the weather strip W can be assembled to the panel Pa wherein the tip-end side engaging portion 112 is engaged with the mounting hole Pb by one touch.

The disclosure of Japanese Patent Application No. 2007-173883, filed on Jul. 2, 2007, is incorporated in the application.

While the invention has been explained with reference to the specific embodiments of the invention, the explanation is illustrative and the invention is limited only by the appended claims.

What is claimed is:

1. A weather strip, comprising:
a flexible strip main body;
a core embedded in the strip main body, and including a main hole, an elongated hole extending from the main hole and having walls to define the elongated hole with a width less than a diameter of the main hole, and an engaged portion formed at a terminal end portion of the elongated hole relative to the main hole, and
an engaging leg member to be inserted into and engaged with a mounting hole on a mounting object, said engaging leg member having a first engaging portion for engaging the mounting hole, and a second engaging portion for engaging the engaged portion of the core, said second engaging portion being a base-side engaging portion with elongated linear marginal portions having a distance substantially same as the width of the elongated hole,
wherein the engaging leg member is arranged such that the base-side engaging portion passes through the main hole and enters the elongated hole in one direction while aligning the linear marginal portions with the walls, and
said base-side engaging portion includes, at one side thereof, a protruding portion for preventing the engaging leg member from entering into the elongated hole from a side of the protruding portion, the protruding portion having an inclined surface gradually decreasing in thickness toward the first engaging portion.

2. A weather strip according to claim 1, wherein the engaging leg member further includes a neck portion under the base-side engaging portion,
wherein the engaged portion includes a grappling face for the base side engaging portion around a deepest portion of the elongated hole away from the main hole for housing the neck portion, and a portion for defining a narrow portion of the elongated hole for allowing the neck portion to be introduced to the deepest portion from the main hole, said portion being elastically deformed when the neck portion passes therethrough.

3. A weather strip according to claim 2, wherein said first engaging portion includes a core portion extending from the neck portion, and a plurality of elastic pieces extending radially outwardly from the core portion.

4. A weather strip according to claim 3, wherein the strip main body covers the core outside the engaging leg member when the engaging leg member is attached to the engaged portion.

5. A weather strip according to claim 1, wherein the strip main body is formed of rubber or plastic with elasticity.

6. A weather strip according to claim 1, wherein the core is formed of a synthetic resin material.

7. A weather strip according to claim 1, wherein the core further includes projections extending from the elongated hole and having a width less than that of the elongated hole, and a flange portion formed around the terminal end portion.

8. A weather strip according to claim 7, wherein the flange portion is arranged between the walls of the elongated hole.

9. A weather strip according to claim 7, wherein the engaging leg member further includes an intermediate flange spaced from the base-side engaging portion, and a neck portion located between the base-side engaging portion and the intermediate flange and having a width less than the base-side engaging portion and the intermediate flange so that the neck portion passes between the projections, and the base-side engaging portion engages the flange portion between the walls of the elongated hole.

10. A weather strip according to claim 9, wherein the base-side engaging portion has a flat upper surface, projects laterally outwardly at the protruding portion, and directly engages the flange portion of the core.

* * * * *